United States Patent
Alley et al.

(10) Patent No.: US 8,073,991 B2
(45) Date of Patent: Dec. 6, 2011

(54) ISOLATED HART INTERFACE WITH PROGRAMMABLE DATA FLOW

(75) Inventors: Daniel Milton Alley, Earlysville, VA (US); Mark Eugene Shepard, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 102 days.

(21) Appl. No.: 12/687,485

(22) Filed: Jan. 14, 2010

(65) Prior Publication Data
US 2011/0172790 A1 Jul. 14, 2011

(51) Int. Cl.
*G06F 13/00* (2006.01)
*G06F 3/00* (2006.01)

(52) U.S. Cl. ............ 710/33; 710/5; 710/8; 710/15; 710/29

(58) Field of Classification Search ............ None
See application file for complete search history.

(56) References Cited

U.S. PATENT DOCUMENTS

| | | | |
|---|---|---|---|
| 7,327,781 B2 | 2/2008 | Loechner | |
| 7,372,914 B2 | 5/2008 | Calvin | |
| 7,386,052 B2 | 6/2008 | Kresse et al. | |
| 7,529,293 B2 | 5/2009 | Lochner | |
| 2003/0093519 A1* | 5/2003 | Jackson et al. | 709/224 |
| 2004/0124854 A1* | 7/2004 | Slezak | 324/644 |
| 2007/0053466 A1 | 3/2007 | Klostermann | |
| 2008/0015799 A1 | 1/2008 | Lalla | |
| 2008/0151973 A1 | 6/2008 | Calvin | |
| 2009/0168857 A1 | 7/2009 | Golborne et al. | |

OTHER PUBLICATIONS

HART Compatible FSK Modem, 2007, Cypress Systems, [online, accessed on Jun. 19, 2011], URL: http://www.cypressenvirosystems.com/files/pdf/hart-modem.pdf.*
GE Energy, "Mark VI Turbine Control Product Description", GEI-100483B Product Description, 2002-2005, 28 pages.
Analog Services, Inc., About HART—Part 1, http://www.analogservices.com/about_part1.htm, 18 pages.
Samson, "HART Communications", Technical Information, Part 4 Communications, L452 EN, 40 pages.

* cited by examiner

*Primary Examiner* — Tariq Hafiz
*Assistant Examiner* — Scott Sun
(74) *Attorney, Agent, or Firm* — Hoffman Warnick LLC; Ernest G. Cusick

(57) ABSTRACT

An isolated highway addressable remote transfer (HART) interface with programmable data flow is provided. The isolated HART interface includes a HART channel having at least one pair of terminals configured to connect with a HART device via a current loop. The HART channel is programmable to have each pair of terminals assigned as a current loop input or a current loop output.

20 Claims, 3 Drawing Sheets

ISOLATED HART INTERFACE WITH PROGRAMMABLE DATA FLOW

BACKGROUND OF THE INVENTION

The present invention relates generally to a component within a control system, and more particularly to a programmable current loop interface that supports Highway Adressable Remote Transfer (HART) protocol signals with point galvanic isolation, for use in controlling and monitoring a HART device.

Control of a steam turbine or gas turbine is one example in which a HART device has industrial applicability. A HART device is generally a sensor or actuator that is embedded with the "smarts" to facilitate communication with a control device using the well-known HART protocol. In the control of a turbine, a HART sensor device controls current flowing in a wire, while a HART actuator device is controlled by the flow of the current in the wire. In accordance with the HART protocol, these functions are performed over the current loop carrying a 4 to 20 milliampere (mA) signal that is superimposed with HART data tones.

In some turbine control systems, HART sensor devices and HART actuator devices may be interfaced to the control system using modules that perform current loop measurements and current loop driving. These HART device modules are generally implemented to have a specified ratio of input channels to output channels in order to perform the current loop measurement and current loop driving functions. Typically, the ratio of input channels to output channels is fixed. Often times, the amount of sensors and actuators used in the control of a turbine does not conform to the specified ratio of input channels to output channels provided in a typical module. For example, a 12 channel module having 10 inputs and 2 outputs may not be well suited for use in a control application that does not have a use for all of the inputs and outputs. For instance, if a control application is desired to have 96 outputs and zero inputs, then it would be necessary to use 48 packs of these 12 channel modules in order to attain the desired ratio of zero inputs to 96 outputs. This is an inefficient use of these modules because all of the inputs (i.e., 480) in the 48 packs would be inactive. In addition, using 48 packs of 12 channel modules to attain the desired ratio of zero inputs to 96 outputs makes the cost of implementing the control application expensive.

BRIEF DESCRIPTION OF THE INVENTION

Therefore, it is desirable to have the capability to configure these highway addressable remote transfer (HART) device modules with channels that are programmable to be assigned as an input and output as desired. Channels that are programmable to be assigned as an input and output as desired would efficiently facilitate attaining a desired ratio of inputs to outputs in a cost-effective manner.

In one aspect of the present invention, a circuit is provided. The circuit comprises a HART channel having at least one pair of terminals configured to connect with a HART device via a current loop. An input/output component is coupled to the HART channel and is configured to support HART protocol signals for communications with the HART device. The input/output component is configurable to programmably assign each pair of terminals of the HART channel as a current loop input or a current loop output. A programmable logic device is coupled to the input/output component and is configured to perform HART-based signal processing operations associated with modulating and demodulating HART protocol signals for communications with the HART device.

In another aspect of the present invention, a current loop interface circuit is provided. In this aspect of the present invention, the current loop interface circuit comprises a HART channel having at least one pair of terminals configured to connect with a HART device via a current loop. An input/output component is coupled to the HART channel and is configured to support HART protocol signals for communications with the HART device. The input/output component is configurable to programmably assign each pair of terminals of the HART channel as a current loop input or a current loop output. A programmable logic device is coupled to the input/output component and is configured to perform HART-based signal processing operations associated with modulating and demodulating HART protocol signals for communications with the HART device. An isolator separates the input/output component from the programmable logic device to provide point galvanic isolation.

In a third aspect of the present invention, a programmable current loop interface circuit supporting HART protocol signals with point galvanic isolation is provided. In this aspect of the present invention, the programmable current loop interface circuit comprises a HART channel having at least one pair of terminals configured to connect with a HART device via a current loop. An input/output component is coupled to the HART channel and is configured to support HART protocol signals for communications with the HART device. The input/output component comprises a configurable input channel and output channel, wherein the input/output component is configurable to programmably assign each pair of terminals of the HART channel as a current loop input or a current loop output. The input channel is configured to sense current of the current loop as controlled by the HART device and sense HART tones imposed on the current. The output channel is configured to set the current loop to a DC current that is sensed by the HART device. A programmable logic device is coupled to the input/output component and is configured to perform HART-based signal processing operations associated with modulating and demodulating HART protocol signals for communications with the HART device. An isolator separates the input/output component from the programmable logic device to provide point galvanic isolation.

DETAILED DESCRIPTION OF THE INVENTION

Various embodiments of the present invention are directed to a programmable current loop interface that supports highway addressable remote transfer (HART) protocol signals with point galvanic isolation for use in controlling and monitoring a HART device. In these embodiments, each channel of the current loop interface is programmable to be assigned as a current loop input or a current loop output. In addition, a programmable logic device is used to provide the "smarts" to monitor the HART tones associated with the HART protocol signals and communicate with the HART device via these tones. An isolator is provided between the current loop interface and the programmable logic device to provide galvanic isolation on each channel of the current loop interface. Technical effects associated with the various embodiments of the present invention allow for a configuration of modules that can have multiple channels that can be assigned as an input or output in order to attain a desired ratio of inputs to outputs. This reduces the need to use additional modules to attain the desired ratio.

Figure 1:
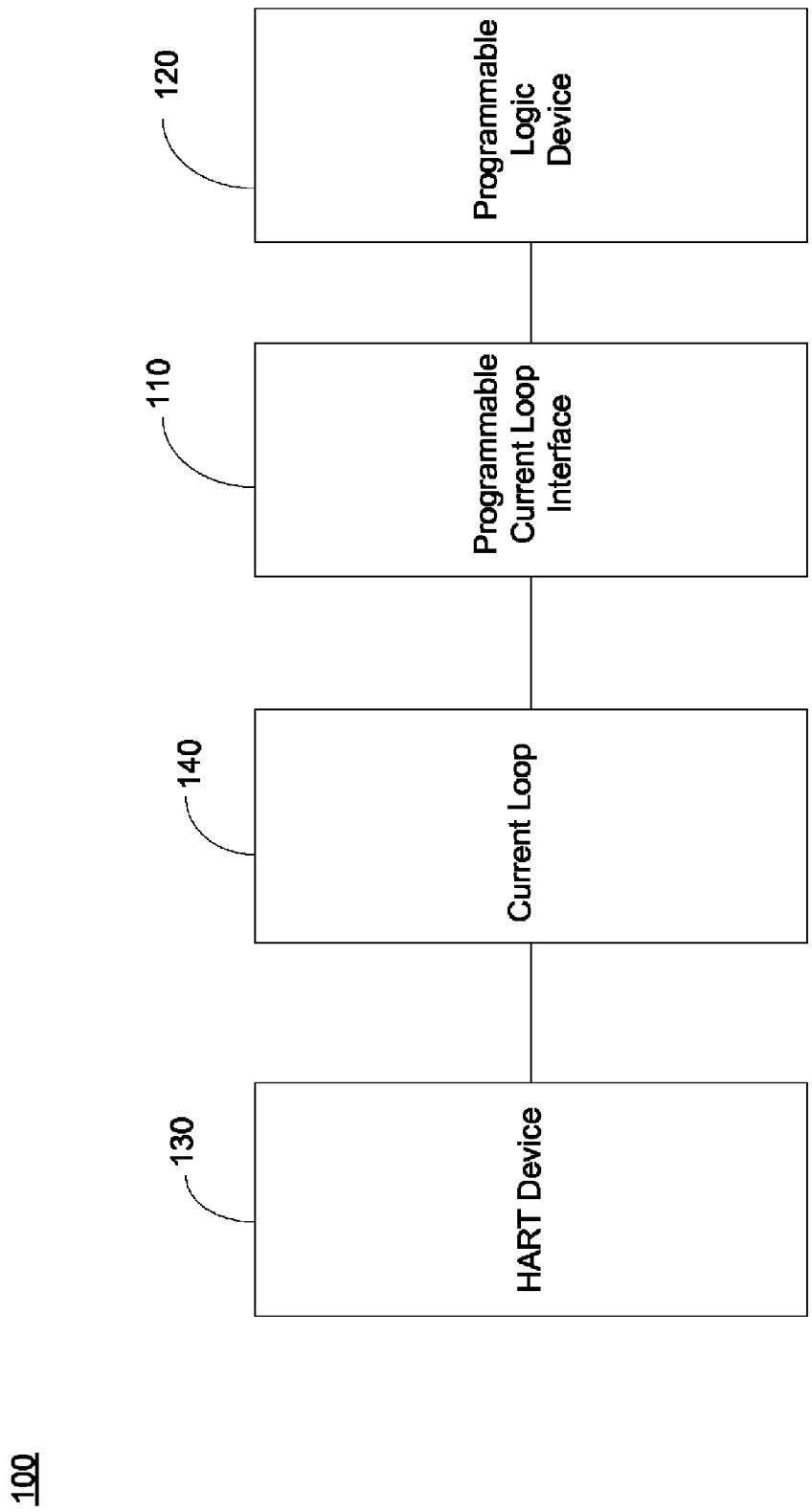
FIG. 1 is a schematic diagram of a control system showing a programmable current loop interface and programmable logic device coupled to a highway addressable remote transfer (HART) device via a current loop according to one embodiment of the present invention.

Referring to the drawings, FIG. 1 is a schematic diagram of a control system 100 showing a programmable current loop interface 110 and programmable logic device 120 coupled to a HART device 130 via a current loop 140. In one embodiment, the HART device 130 may be a sensor, transmitter or actuator that is used in the control of a turbine. The HART device 130 is embedded with the "smarts" to facilitate communication with the current loop interface 110 and programmable logic device 120 using the well-known HART protocol. Although not shown in FIG. 1, the current loop interface 110 and programmable logic device 120 may be in communication with a remote host computer that can monitor and facilitate control of the HART device 130. For example, the remote host computer via the current loop interface 110 and programmable logic device 120 can use HART protocol to monitor items such as operating status, calibration information, dates of calibration, operating conditions experienced, etc., and diagnose problems that may arise.

Although the control system 100 of FIG. 1 is described with respect to use in the control of a turbine, those skilled in the art will recognize that the various embodiments of the present invention are not limited to use solely with monitoring and controlling a turbine. Instead, the various embodiments of the present invention have a wide range of applicability that is suitable for any setting that may employ HART devices such as sensors, transmitter, and actuators in the control of an industrial process. A non-exhaustive listing of possible industrial settings where the various embodiments of the present invention are suitable for use includes power generation plants, chemical facilities and electrical facilities. Those skilled in the art will further recognize that the teachings herein may be suited to other applications in addition to industrial settings such as, for example military, commercial and residential applications.

Referring back to FIG. 1, the HART device 130 is connected in series with the current loop 140 that has an external power source (not shown) coupled thereto. If the HART device 130 is a sensor device, then it controls current flowing in the current loop 140, while an actuator device reacts to the flow of the current in the current loop. The reaction to the current flow in the current loop 140 or control of the flow in the current loop occurs over data lines or channels provided by the programmable current loop interface 110. The channels provided by the programmable current loop interface 110 are used to superimpose HART data tones containing the communications data transferred between the HART device 130 and the interface. As explained below in more detail, each channel of the current loop interface 110 is programmable to be assigned as a current loop input or a current loop output in order to facilitate a control system that better meets the needs of the system to be controlled as opposed to having channels fixed in their designation, which has been found to be inefficient and costly in setting up a control application.

Figure 2:
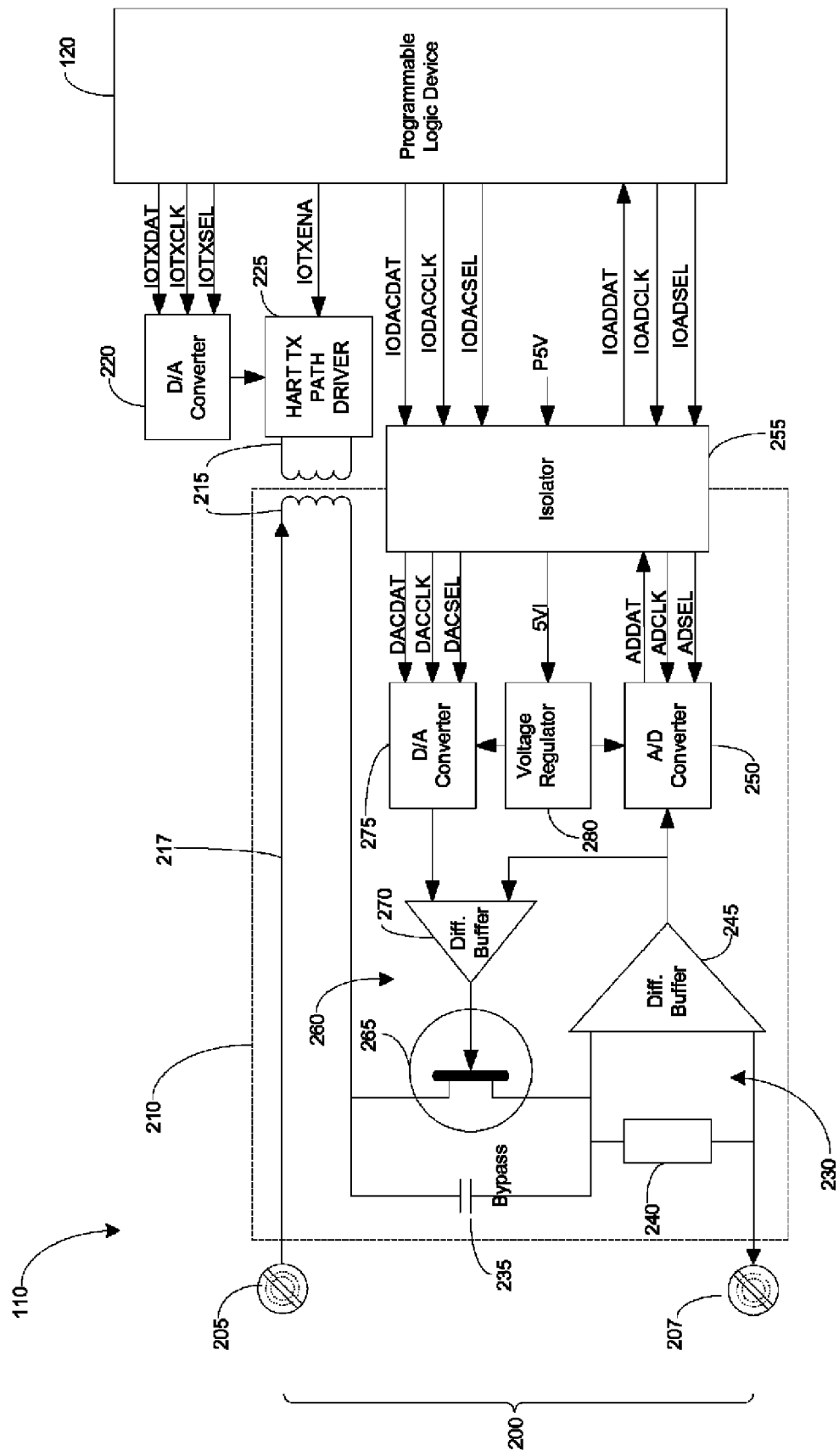
FIG. 2 is a more detailed diagram of the programmable current loop interface and programmable logic device depicted in FIG. 1 according to one embodiment of the present invention.

FIG. 2 is a more detailed diagram of the programmable current loop interface 110 and programmable logic device 120 depicted in FIG. 1 according to one embodiment of the present invention. As shown in FIG. 2, the programmable current loop interface circuit 110 includes a HART channel 200 having a pair of terminals 205 and 207 configured to connect with the HART device 130 (shown in FIG. 1) via the current loop 140 (shown in FIG. 1). The current loop that flows in and out of terminals 205 and 207 contains a direct current (DC) signal and an alternating current (AC) signal. For ease of illustrating the various embodiments of the present invention, the current loop interface 110 is shown only having one channel of terminals. Those skilled in the art will recognize that the current loop interface circuit 110 can have more channels made up of terminals 205 and 207 or in another embodiment, multiple current loop interface circuits 110 can be configured into a module having a predetermined amount of terminals that can be programmed to be assigned as a current loop input or a current loop output.

Referring back to FIG. 2, the current loop interface circuit 110 further includes an input/output component 210, coupled to the terminals 205 and 207 of the HART channel 200 that is configured to support HART protocol signals for communications with the HART device. The input/output component 210 comprises a configurable input channel and output channel. The input channel is configured to sense current of the current loop as controlled by the HART device and sense HART tones imposed on the current, whereas the output channel is configured to set the current loop to a DC current that is sensed by the HART device. The elements that formed both the input channel and output channel are described below in more detail.

The input channel of the input/output component 210 comprises a transformer 215 connected in series to one of the terminals 205 of the HART channel 200 via line 217 carrying the current from the current loop. The current flowing through the windings on the left-hand side of the transformer 215 creates a voltage represented by a DC signal. As explained below, the windings on the right-hand side of the transformer 215 receives HART tones generated from the programmable logic device 120 via a digital-to-analog (D/A) converter 220 and a HART transmitter (TX) path driver 225. The HART tones from the HART transmitter (TX) path driver 225 are injected through transformer 215 resulting in a modulation of the current flowing through. Because the HART tones are represented by an AC signal, the transformer 215 will modulate the DC signal formed at the windings of the left-hand side of the transformer with the AC signal.

The input channel further comprises a current determiner 230 that measures the current in the input channel as a function of voltage. As explained below, the current flowing from the transformer 215 is received by the current determiner 230 via a bypass component 235 that separates the AC signal from a DC current regulator 260 within the output channel. As shown in FIG. 2, in one embodiment, the current determiner 230 comprises a current burden resistor 240 that is in parallel with a differential buffer 245. Essentially, the differential buffer 245 determines the voltage of the resistor in order to ascertain the current that is represented by the DC signal and AC signal. An analog-to-digital (A/D) converter 250 receives the current measurement from the differential buffer 245 and separates the DC signal from the AC signal by sampling the signal at a high enough data rate that supports extracting both. The A/D converter 250 provides the digitized measured current that contains the DC signal and AC signal to the programmable logic device 120 via an isolator 255 that is configured to provide point galvanic isolation of the current loop interface circuit 110 with the programmable logic device. As explained below, the programmable logic device 120 is configured to sense and modulate the HART tones in the input channel of the input/output component 210.

The output channel of the input/output component 210 comprises the current loop regulator 260 configured to set the current loop to a DC current that is to be sensed by the HART device. In one possible embodiment, as shown in FIG. 2, the current loop regulator may comprise a transistor 265 coupled to a differential buffer 270. The differential buffer 270 receives the current measurement as determined by the current determiner 230. In addition to receiving the current measurement as determined by the current determiner 230, the differential buffer 270 receives a current setting specified by the programmable logic device 120. As shown in FIG. 2, the programmable logic device 120 outputs this current setting to the differential buffer 270 via a D/A converter 275. The D/A converter 275 converts the digital current setting to an analog current setting which is eventually passed from the differential buffer 270 to the transistor 265. Note a voltage regulator 280 is placed in between the D/A converter 275 and the A/D converter 250 and is used to provide each converter with the necessary voltage to perform its intended functions by using the voltage provided by the isolator 255 (e.g., 5V).

As mentioned above, the isolator 255 provides point galvanic isolation of the current loop interface circuit 110 with the programmable logic device 120. Point galvanic isolation allows the flow of data signals in different directions and enables one HART channel to function along side another HART channel. In one embodiment, the isolator 255 may be a commercially available component that can be configured to provide isolation between the current loop interface circuit 110 with the programmable logic device 120. One example of a commercially available isolator is an ADUM5400 series isolator sold by Analog Devices. As shown in FIG. 2, the isolator 255 has a plurality of data lines that are used to interact with the A/D converter 250, D/A converter 275, voltage regulator 280 and the programmable logic device 120. In particular, the data lines that communicate with the A/D converter 250 include ADDAT, ADCLK and ADSEL. The data lines that communicate with the D/A converter 275 include DACDAT, DACCLK and DACSEL. The data lines that communicate with the programmable logic device 120 include IODACDAT, IODACCLK, IODACSEL, IOADDAT, IOADCLK and IOADSEL. Those skilled in the art will recognize that additional data lines may be implemented with the isolator 255.

As explained below, the programmable logic device 120 is configured to sense and modulate the HART tones in the input and output channel of the input/output component 210. In one embodiment, the programmable logic device 120 may be a commercially available field programmable gate array (FPGA) that can be configured to perform the functions described herein. As shown in FIG. 2, the programmable logic device 120 has a plurality of data lines that are used to interact with the D/A converter 220, HART transmitter path (TX) driver 225 and the isolator 255. In particular, the data lines that communicate with the D/A converter 220 include IOTXDAT, IOTXCLK, IOTXSEL. The data lines that communicate with the HART transmitter path driver 225 includes IOTXENA. The data lines that communicate with the isolator 255 include IODACDAT, IODACCLK, IODACSEL, IOADDAT, IOADCLK and IOADSEL. Those skilled in the art will recognize that additional data lines may be implemented with the programmable logic device 120.

The input and output channel of the input/output component 210 operates in the following manner. In operation as the input channel, a current is provided to data line 217 via terminal 205. The current flows through the windings on the left-hand side of the transformer 215. In order to inject the HART tones into the current, the programmable logic device 120 asserts IOTXSEL to the D/A converter 220 and IOTXENA to the HART transmitter (TX) path driver 225. In response to assertion of the data lines, the D/A converter 220 awakes and receives HART tones via IOTXDAT in accordance with a series of clock pulses associated with IOTXCLK. The HART transmitter (TX) path driver 225 will then pass the HART tones to the windings on the right-hand side of the transformer 215, which then injects the HART tones into current flowing through the windings on the left-hand side of the transformer. The bypass component, which in one embodiment, may include a capacitor that is configured to permit the loop current to continue to the current determiner 230.

The current determiner 230, which in the embodiment shown in FIG. 2 comprises the current burden resistor 240 and differential buffer 245, determines the current as a function of voltage. The A/D converter 250 receives the current measurement from the differential buffer 245 and separates the DC signal from the AC signal by sampling the signal at a high enough data rate that supports extracting both. More specifically, the isolator 255 asserts ADSEL to the A/D converter 250. In response to assertion of the ADSEL data line, the A/D converter 250 awakes and measures the DC and AC component of the current measurement via ADDAT in accordance with a series of clock pulses associated with ADCLK. Simultaneously, the programmable logic device 120 asserts IOADSEL to the isolator 255. In response to assertion of the IOADSEL data line, the isolator 255 receives the DC and AC component of the current measurement from the A/D converter 250 and transfers to the programmable logic device 120 via IOADAT in accordance with a series of clock pulses associated with IOADCLK.

In operation as the output channel, the current loop regulator 260 sets the current loop in accordance with the DC current specified by the programmable logic device 120 and the D/A converter 275. The current is provided to the current loop regulator 260 in response to the programmable logic device 120 asserting IODACSEL which activates the isolator which asserts DACSEL to activate the D/A converter 275. The programmable logic device 120 outputs the specified current along the IODACDAT line in accordance with a series of clock pulses associated with IODACCLK. The isolator 255 then transfers the current to the D/A converter 275 along the DACDAT line in accordance with a series of clock pulses associated with DACCLK. The differential buffer 270 of the current regulator 260 receives the specified current as well as a current determined by the current determiner 230. The bypass component 235 permits the specified DC loop current to move to terminal 207 and not be affected by any HART tones generated from D/A converter 220 and HART transmitter path driver 225.

FIG. 2 shows one example of a design that implements a programmable current loop interface 110 in accordance with the concepts of the various embodiments of the present invention. Those skilled in the art will recognize that other elements can be used to achieve the functions described here. For example, it may be possible to use A/D converters containing a built in differential input (absorbing the function of differential buffer 245) and built in current sensing circuitry as a current determiner 230 in place of the current resistor 245 and the differential buffer 245; D/A converters with provisions for built in current outputs as a current regulator 260 in place of the D/A 275, transistor 265 and the differential buffer 270;

and other forms of AC coupling circuitry not limited to resistor-capacitor-inductor circuit combinations to provide a high pass filter role as the bypass component 235.

Figure 3:
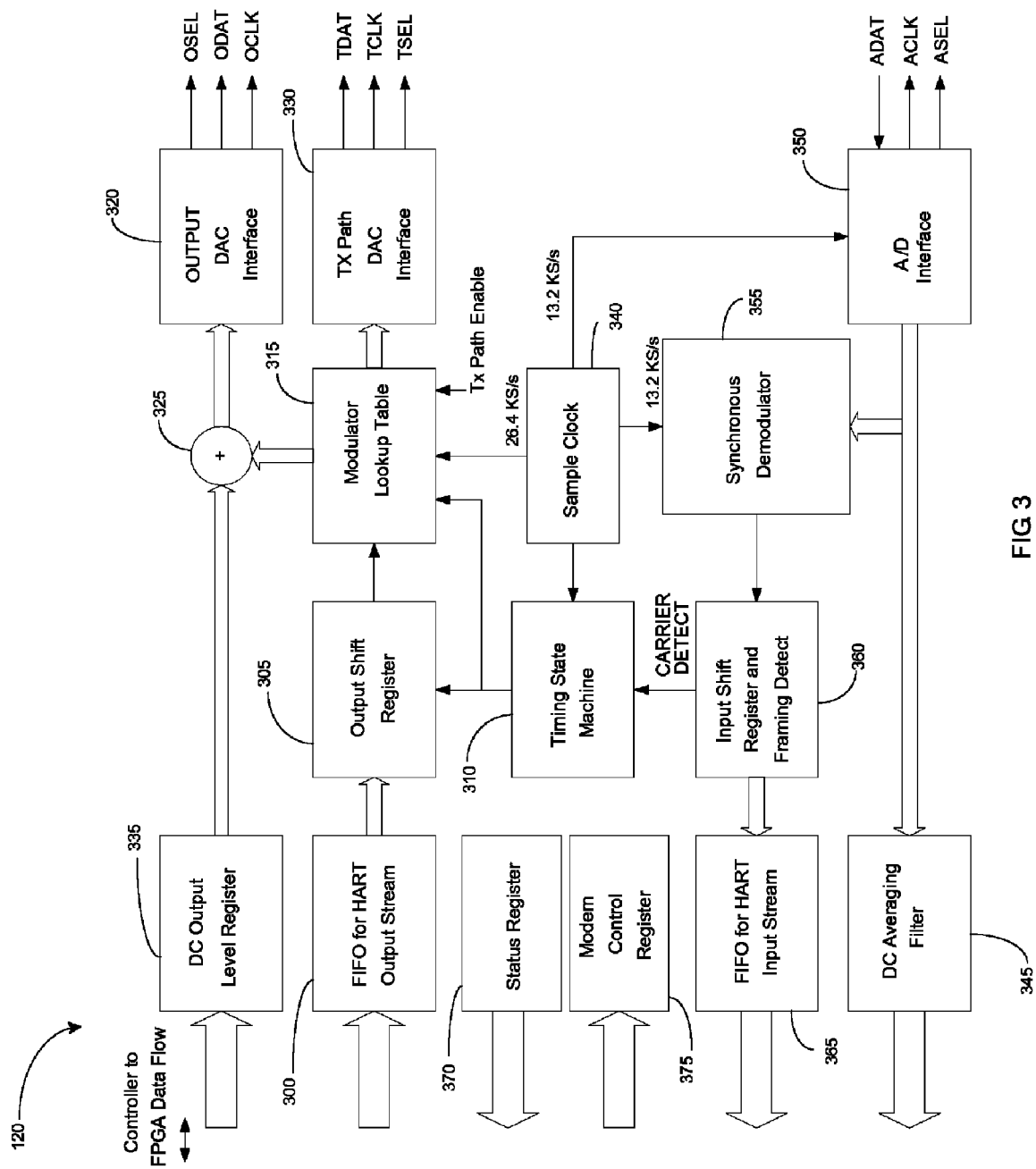
FIG. 3 is a more detailed diagram of the programmable logic device depicted in FIGS. 1 and 2 according to one embodiment of the present invention.

FIG. 3 is a more detailed diagram of the programmable logic device 120 depicted in FIGS. 1 and 2 according to one embodiment of the present invention. In particular, FIG. 3 shows the logic components associated with the programmable logic device that enable it to perform the operations described herein with respect to the various embodiments of the present invention. In addition to the signal processing operations, setting the DC current for the HART device 130 (FIG. 1), injecting HART tones, the programmable logic device 120 can perform other operations that may include checking the status of the HART device, controlling operation of the HART device, reading information transmitted from the HART device, communicating with a remote control device, etc. Generally, the basic operations performed by the programmable logic device 120 embody injecting or modulating the HART tones in the current received from the HART device via the D/A converter 220, HART transmitter path driver 225 and transformer 215 and setting the DC current for the current loop regulator 260 to apply to the HART device.

In order to initiate the injecting of the HART tones in the current received from the HART device via the D/A converter 220, HART transmitter (TX) path driver 225 and transformer 215 (FIG. 2), a first in first out (FIFO) component 300 generates a string of data for use as a HART input stream (i.e., HART tones) that are loaded into an output shift register component 305. Typically, this occurs when the programmable logic device 120 is commanded that it is time to transmit information to the HART device. At this time, a timing state machine 310 informs the output shift register 305 that it is time to start transmitting information. As a result, the output shift register 305 shifts out one bit of information at a time. The information shifted from the output shift register 305 is received by a modulator look-up table 315. In one embodiment, the modulator look-up table 315 determines a HART tone according to the received information. In particular, the modulator look-up table 315 receives the information from the output shift register 305, which is in the form of "1"s and "0"s, and uses logic to generate sequential samples from a table that correspond to the information received from the register so that it can determine the right HART tones to be transferred to the D/A converter 220 (see FIG. 2). A summer 325 (subject to control from the modem control register 375) then aggregates the HART tones from the modulator look-up table 315 with DC information provided from a DC output level register 335; or it may pass the DC information alone. This allows for either the D/A converter 220 to control the loop at a higher bandwidth to generate both the AC and DC content in the current loop, or just the DC content at a lower bandwidth. This information is then sent to the D/A converter 220 via the output D/A converter interface (DAC) 320. In addition, the HART tone specified by the modulator look-up table 315 is sent to the HART transmitter (TX) path driver 225 (FIG. 2) via a transmitter path D/A converter (DAC) interface 330. Note that output D/A converter (DAC) interface 320 communicates with the D/A converter 230 with data lines OSEL, ODAT, and OCLK, while transmitter (TX) path D/A converter interface 330 communicates with the HART transmitter (TX) path driver 225 with data lines TSEL, TDAT, and TCLK. Further, a sample clock 340 provides the timing to the timing state machine 310 and modulator look-up table 315 so that their respective operations can be performed.

Generally, the operation of setting the DC current for the current loop regulator 260 that is applied to the HART device includes reading current information provided from the A/D converter 250 and isolator 255 (FIG. 2). As mentioned before, the A/D converter 250 is oversampling the data from the current determiner in order to separate the DC component from the AC component. In order to read the information and separate the DC component from the AC component, the programmable logic device includes a DC averaging filter 345 that receives information from the A/D converter 250 and isolator 255 via an A/D interface 350. In one embodiment, the DC averaging filter 345 is a 25 Hz low pass filter. Those skilled in the art will recognize that other averaged devices could be used such as for example, a finite impulse response (FIR) filter or an infinite impulse response (IIR) filter. As shown in FIG. 3, the A/D interface 350 communicates with the isolator 255 (FIG. 2) and the A/D converter 250 (FIG. 2) with data lines ASEL, ADAT, and ACLK as clocked by the sample clock 340.

FIG. 3 further shows that a synchronous demodulator 355 receives the current data from the D/A converter 250 (FIG. 2) and isolator 255 (FIG. 2). In one embodiment, the synchronous demodulator 355 extracts bits of information from the current data and sends extracted information to an input shift register and framing detect component 360 as a function of the sample clock 340. In addition to extracting information, the synchronous demodulator 355 may function for example as a bandpass filter, shift register, exclusive-or-gate, a low pass filter and a threshold circuit. In one embodiment, the input shift register and framing detect component 360 analyzes the extracted information and ascertains whether the sampled data comprises both a DC component and an AC component (i.e., the HART tones). An indication that the extracted information contains a DC component and an AC component is provided to the timing state machine 310 in the form of a carrier detect signal. Generally, the timing state machine 310 uses the carrier detect signal as an indication as whether the HART device has been communication with the current loop interface 110. In addition to providing carrier detect signal to the timing state machine 310, the input shift register and framing detect component 360 provides the extracted information to a FIFO component 365 that generates a HART input stream.

Other components included in the programmable logic device 120 as shown in FIG. 3 include a status register 370 and a modem control register 375. The function of the status register 370 includes providing an indication of the programmable logic's operating state such as timing state machine 310's current mode, detection of any error conditions within the logic such as a framing error in input shift register 360, and the state of the output FIFO 300 and input FIFO 365 including full, half full, and empty. The function of the modem control register 375 includes control of the modulator summer 325, enables for the operation of the state machine 310, resets for the demodulator 355 and state machine 310, and controls the transmitter path D/A converter interface 330 and output D/A converter 320 for allowing lower power modes if not in use.

FIG. 3 shows one example of a design that can form the programmable logic device 120 in accordance with the concepts of the various embodiments of the present invention. Those skilled in the art will recognize that additional or less elements than what is shown in FIG. 3 can be used to achieve the functions described here. For example, it may be possible to use other versions of functional blocks not limited to the demodulator 355, the modulator look up table 315 both in contents and in size, methods of interfacing to the output D/A converter 320, transmitter path D/A converter 330, and A/D interface 350. Further, the logic may be within a programmable device such as a Field Programmable Gate Array (FPGA), Complex Programmable Logic Device (CPLD), or a custom integrated circuit that is not programmable.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

What is claimed is:

1. A circuit, comprising:
    a highway addressable remote transfer (HART) channel having at least one pair of terminals configured to connect with a HART device via a current loop;
    an input/output component coupled to the HART channel that is configured to support HART protocol signals for communications with the HART device, wherein the input/output component is configurable to programmably assign each pair of terminals of the HART channel as a current loop input or a current loop output, the current loop input and the current loop output each having bi-directional interaction with the HART protocol signals for communications with the HART device; and
    a programmable logic device coupled to the input/output component that is configured to perform HART-based signal processing operations associated with modulating and demodulating HART protocol signals for communications with the HART device, the programmable logic device further configured to control the programmable assignment of each pair of terminals of the HART channel as a current loop input or a current loop output by the input/output component.

2. The circuit according to claim 1, wherein the input/output component comprises a configurable input channel and output channel, the input channel configured to sense current of the current loop as controlled by the HART device and sense HART tones imposed on the current, the output channel configured to set the current loop to a current that is sensed by the HART device.

3. The circuit according to claim 2, wherein the programmable logic device is configured to sense and demodulate HART tones in the input channel and sense a DC current in the output channel.

4. The circuit according to claim 3, wherein the programmable logic device connects to a transformer connected in series to one of the terminals of the HART channel.

5. The circuit according to claim 4, wherein the transformer is configured to receive HART tones from the programmable logic device and modulate the HART tones onto the current passing through the channel.

6. The circuit according to claim 3, wherein the input channel further comprises a current determiner that measures the current in the input channel as a function of voltage.

7. The circuit according to claim 6, wherein the current determiner comprises a current resistor coupled in series to the transformer and a differential buffer in parallel with the current resistor.

8. The circuit according to claim 7, wherein the input channel further comprises an analog-to-digital converter that digitally represents the measured current, wherein the analog-to-digital converter provides the digitized measured current to the programmable logic device.

9. The circuit according to claim 3, wherein the output channel comprises a current loop regulator configured to set the current loop to the DC current.

10. The circuit according to claim 9, further comprising a bypass component that separates an AC signal from the current loop regulator.

11. The circuit according to claim 9, wherein the output channel comprises a digital-to-analog converter that converts a digital current setting specified by the programmable logic device to an analog current setting that is provided to the current loop regulator.

12. The circuit according to claim 1, wherein the input/output component further comprises an isolator that is configured to provide point galvanic isolation with the programmable logic device.

13. The circuit according to claim 12, wherein the isolator separates the input/output component from the programmable logic device.

14. A current loop interface circuit, comprising:
    a highway addressable remote transfer (HART) channel having at least one pair of terminals configured to connect with a HART device via the current loop;
    an input/output component coupled to the HART channel that is configured to support HART protocol signals for communications with the HART device, wherein the input/output component is configurable to programmably assign each pair of terminals of the HART channel as a current loop input or a current loop output, the current loop input and the current loop output each having bi-directional interaction with the HART protocol signals for communications with the HART device;
    a programmable logic device coupled to the input/output component that is configured to perform HART-based signal processing operations associated with modulating and demodulating HART protocol signals for communications with the HART device, the programmable logic device further configured to control the programmable assignment of each pair of terminals of the HART channel as a current loop input or a current loop output by the input/output component; and
    an isolator separating the input/output component from the programmable logic device to provide point galvanic isolation.

15. The circuit according to claim 14, wherein the input/output component comprises a configurable input channel and output channel, the input channel configured to sense current of the current loop as controlled by the HART device and sense HART tones imposed on the current, the output channel configured to set the current loop to a current that is sensed by the HART device.

16. The circuit according to claim 15, wherein the programmable logic device is configured to sense and demodulate HART tones in the input channel and sense a DC current in the output channel.

17. The circuit according to claim 16, wherein the programmable logic device connects to a transformer connected in series to one of the terminals of the HART channel, wherein the transformer is configured to receive HART tones from the programmable logic device and modulate the HART tones onto the current passing through the channel; a current determiner that measures the current in the input channel as a function of voltage; and an analog-to-digital converter that digitally represents the measured current, wherein the analog-to-digital converter provides the digitized measured current to the programmable logic device.

18. The circuit according to claim 16, wherein the output channel comprises: a current loop regulator configured to set the current loop to the DC current; and a digital-to-analog converter that converts a digital current setting specified by the programmable logic device to an analog current setting that is provided to the current loop regulator.

19. The circuit according to claim 18, further comprising a bypass component that separates AC Hart tones from the DC current signal flow through the current regulator.

20. A programmable current loop interface circuit supporting highway addressable remote transfer (HART) protocol signals with point galvanic isolation, comprising:
- a HART channel having at least one pair of terminals configured to connect with a HART device via the current loop;
- an input/output component coupled to the HART channel that is configured to support HART protocol signals for communications with the HART device, wherein the input/output component comprises a configurable input channel and output channel, wherein the input/output component is configurable to programmably assign each pair of terminals of the HART channel as a current loop input or a current loop output, wherein the input channel is configured to sense current of the current loop as controlled by the HART device and sense HART tones imposed on the current, the output channel configured to set the current loop to a DC current that is sensed by the HART device, and wherein the current loop input and the current loop output each has bi-directional interaction with the HART protocol signals for communications with the HART device;
- a programmable logic device coupled to the input/output component that is configured to perform HART-based signal processing operations associated with modulating and demodulating HART protocol signals for communications with the HART device, the programmable logic device further configured to control the programmable assignment of each pair of terminals of the HART channel as a current loop input or a current loop output by the input/output component; and
- an isolator separating the input/output component from the programmable logic device to provide point galvanic isolation.

* * * * *